United States Patent [19]

Ryoke et al.

[11] Patent Number: 5,633,068
[45] Date of Patent: May 27, 1997

[54] ABRASIVE TAPE HAVING AN INTERLAYER FOR MAGNETIC HEAD CLEANING AND POLISHING

[75] Inventors: Katsumi Ryoke; Masaaki Fujiyama; Keisuke Yamada, all of Kanagawa, Japan

[73] Assignee: Fuji Photo Film Co., Ltd., Kanagawa, Japan

[21] Appl. No.: 525,158

[22] Filed: Sep. 8, 1995

[30] Foreign Application Priority Data

Oct. 14, 1994 [JP] Japan ................... 6-274288

[51] Int. Cl.$^6$ ............... B24D 11/02; G11B 5/41
[52] U.S. Cl. .......... 428/143; 428/141; 428/149; 428/148; 428/323; 428/328; 428/332; 428/337; 428/334; 428/480; 428/213; 428/215; 360/128; 51/298; 51/295; 451/539
[58] Field of Search ................... 428/141, 143, 428/149, 148, 323, 328, 332, 337, 334, 480, 213, 215; 360/128; 51/298, 295; 451/539

[56] References Cited

U.S. PATENT DOCUMENTS

| | | | |
|---|---|---|---|
| 2,581,414 | 1/1952 | Hochberg | 241/22 |
| 2,855,156 | 10/1958 | Hochberg et al. | 241/22 |
| 4,138,229 | 2/1979 | Tadokoro et al. | 51/398 |
| 4,397,911 | 8/1983 | Akashi et al. | 428/323 |
| 4,652,958 | 3/1987 | Miyoshi et al. | 360/128 |
| 4,701,364 | 10/1987 | Miyoshi et al. | 428/141 |
| 4,767,644 | 8/1988 | Yamaguchi et al. | 51/295 |
| 4,789,590 | 12/1988 | Sato et al. | 428/900 |
| 4,840,842 | 6/1989 | Yamaguchi et al. | 428/329 |
| 4,922,675 | 5/1990 | Sato et al. | 428/331 |
| 5,089,330 | 2/1992 | Sato et al. | 428/323 |
| 5,147,416 | 9/1992 | Ohishi | 51/295 |
| 5,199,227 | 4/1993 | Ohishi | 51/293 |
| 5,366,525 | 11/1994 | Fujiyama | 51/295 |
| 5,456,734 | 10/1995 | Ryoke et al. | 51/295 |
| 5,510,179 | 4/1996 | Fukushima et al. | 428/323 |

FOREIGN PATENT DOCUMENTS

| | | |
|---|---|---|
| 2106275 | 4/1918 | Japan . |
| 62-92205 | 4/1987 | Japan . |
| 63-47069 | 2/1988 | Japan . |
| 388122 | 4/1991 | Japan . |
| 445814 | 10/1992 | Japan . |
| 4318324 | 11/1992 | Japan . |
| 61-39531 | 5/1994 | Japan . |
| 61-79174 | 6/1994 | Japan . |

*Primary Examiner*—William Watkins
*Attorney, Agent, or Firm*—Sughrue, Mion, Zinn, Macpeak & Seas

[57] ABSTRACT

An abrasive tape is disclosed, comprising a flexible support having thereon an abrasive layer containing mainly an abrasive particle and a binder resin, wherein said abrasive layer has a thickness of from 0.3 to 10.0 µm, an interlayer is provided between said abrasive layer and said flexible support, the thickness of said interlayer is 1 µm or more, 30% or more of the thickness of said flexible support and larger than the thickness of said abrasive layer, and said interlayer has a Young's modulus of from 10 to 150 Kg/mm$^2$. The abrasive tape may be used for cleaning and polishing a magnetic head.

6 Claims, No Drawings

ABRASIVE TAPE HAVING AN INTERLAYER FOR MAGNETIC HEAD CLEANING AND POLISHING

FIELD OF THE INVENTION

The present invention relates to an abrasive tape for use in polishing or cleaning a magnetic head of a magnetic recording/reproducing apparatus, an abrasive tape for use in cleaning, polishing, burnishing or texturing various materials (in particular, a magnetic recording medium) and the removal of color filter protrusions, more specifically, it relates to an abrasive tape or a cleaning tape for roughing or finishing a magnetic head of a VTR or an audio deck.

BACKGROUND OF THE INVENTION

A magnetic head for a video or an audio is particularly required to have smoothness on the tape sliding surface and to remove deposits (i.e., attachments) on the head sliding surface. Accordingly, in general, after roughing in the production of a magnetic head, the magnetic head is disposed at a predetermined position and then an abrasive tape is run between two reels with the magnetic head being interposed therebetween to finish a smooth tape-sliding surface of the magnetic head or an abrasive tape is disposed within the cassette to remove the attachments on the sliding surface of the magnetic head. The above-described abrasive tape is produced by providing on a non-magnetic support a fine abrasive particle and a binder or an abrasive particle, a ferromagnetic fine powder and a binder. The abrasive tape has flexibility and therefore, accords with conventional curved shape of the tape-sliding surface of the magnetic head, so that the head surface can be precisely polished and smoothed or the attachments can be removed.

The abrasive layer of the abrasive tape contains a silicon oil or various lubricants as an additive which improve fitting of the abrasive tape to the magnetic head and achieve a good sliding of the same relative to the magnetic head. In this regard, see JP-A-62-92205 (the term "JP-A" as used herein means an "unexamined published Japanese patent application"), JP-A-63-47069 and JP-B-4-22283 (the term "JP-B" as used herein means an "examined Japanese patent publication") describe thereon.

Further, in order to eliminate static electricity which brings about insufficient cleaning or electrostatic adsorption to generate faults on the polishing surface, giving rise to one of causes for obstacles in precisely polishing the magnetic head, an abrasive tape having provided between the abrasive layer and the flexible support thereof an electrically conductive layer has been put into practice. The above abrasive tape is disclosed in JP-A-3-88122 and JP-A-2-106275. JP-A-2-106275 discloses an abrasive tape where an electric conductor layer is provided between the abrasive layer and the substrate.

Further, JP-A-6-139531 discloses a cleaning tape that a Young's modulus of the first cleaning layer as the uppermost layer (corresponding to the abrasive layer of the present invention) is higher than that of the second cleaning layer (corresponding to the interlayer of the present invention) provided under the first cleaning layer, and further it is concretely described in JP-A-6-139531 that the Young's modulus of the second cleaning layer is 300 to 2000 kg/mm$^2$.

Also, JP-A-6-179174 discloses an abrasive body having a fine particle-containing layer (corresponding to the interlayer of the present invention) between an abrasive layer and a flexible support. However, JP-A-6-179174 has no words as to the Young's modulus though the abrasive body having the interlayer is well-known.

On the other hand, an attempt has been made to improve the abrasive property of the material to be polished by controlling the abutting of the abrasive tape against the material to be polished and JP-B-U-4-45814 (the term "JP-B-U" as used herein means an "examined Japanese utility model publication") discloses an abrasive tape where a buffer resin layer is provided between the abrasive layer and the support and reports that the buffer resin layer is effective in preventing the occurrence of faults due to an excessive pressure applied particularly to a thin material to be polished. Here, the reference does not disclose a magnetic head as the material to be polished.

To the same effect as in JP-B-U-4-45814, JP-A-4-318324 discloses an abrasive tape where a soft resin layer is formed between the abrasive layer and the support and reports that since the magnetic head of the magnetic disk is floated, an appropriate texture can be imparted without generating deep faults on the disk surface.

Now, in recent years, as the magnetic recording is driven into high density recording, the magnetic head used is also required to have a precision shape and more excellent surface properties. Examples of such a magnetic head include heads having a narrow width for high density recording, such as a thin film head, an amorphous head, a laminate head, an MIG head and an MR head. More specifically, in processing such a magnetic head, roughing at an initial stage and finishing at a final stage are conducted, but if the precision polishing as described above is required, adhesion of an organic material eluted from the abrasive layer or alteration of the layer to be polished by itself may occur to impair the magnetic properties of the magnetic head. If the adhesion of the organic material is eliminated strongly, an antinomic problem arises that the magnetic head is excessively polished and as a result, the effective depth is reduced. In the case of a video head, the effective depth is usually from 10 to 30 µm. If the effective depth is lost, the spacing loss increases to cause reduction in the output.

In order to overcome these problems, it seems to be effective to produce an abrasive tape according to the above-described technique by providing an electrically conductive layer or a resin layer on a non-magnetic support and providing thereon an abrasive layer, however, if the conventional technique is applied as it is, it is very difficult for the abrasive tape obtained to polish a thin film head or a narrower head such as an amorphous head, a laminate head, an MIG head and an MR head in a short period of time to obtain smoothness or a desired shape without undergoing any alteration, or to polish for removing the attachments on the magnetic head in a short time while not reducing so much the effective depth and smooth the head shape to improve the output.

SUMMARY OF THE INVENTION

The object of the present invention is to overcome the above-described problems and to provide an abrasive tape which can polish a thin film head or a narrow head for high density recording, such as an amorphous head, a laminate head, an MIG head and an MR head, in a short time to obtain smoothness or a desired shape without forming any alteration layer or can polish for removing the attachments on the magnetic head in a short time without reducing the effective depth so much while ensuring good abutting against the head.

The object of the present invention can be achieved by an abrasive tape comprising a flexible support having thereon an abrasive layer containing mainly an abrasive particle and a binder resin, wherein the abrasive layer has a thickness of from 0.3 to 10.0 µm, an interlayer is provided between the abrasive layer and the flexible support, the thickness of the interlayer is 1 µm or more, 30% or more of the thickness of the flexible support and larger than the thickness of the abrasive layer, and the interlayer has a Young's modulus of from 10 to 150 Kg/mm².

DETAILED DESCRIPTION OF THE INVENTION

The present invention has overcome the above-described problems, with the notice of abutting of the abrasive tape against the magnetic head, by specifying respective thicknesses of the interlayer as a cushioning layer, an abrasive layer provided on the interlayer and the flexible support and also by controlling the Young's modulus of the interlayer to fall within a specific range.

More specifically, assuming that the thickness of the flexible support of the present invention is $t_1$ (µm), the thickness of the interlayer is $t_2$ (µm) and the thickness of the abrasive layer is $t_3$ (µm), the following expressions must be satisfied in the present invention:

$$0.3 \text{ µm} \leq t_3 \leq 10.0 \text{ µm} \quad (1)$$

$$1 \text{ µm} \leq t_2 \text{ and } 0.3 t_1 \text{ µm} \leq t_2 \quad (2)$$

$$t_3 < t_2 \quad (3)$$

From expression (2), $100 t_2/t_1$ (%) $\geq 30$ (%) can be derived. "$100 t_2/t_1$" may be hereinafter referred to as an interlayer ratio.

In the above-described expressions, $t_1$ is generally from 5 to 100 µm, preferably from 10 to 75 µm, more preferably from 12 to 55 µm, $t_2$ is generally from 1 to 20 µm, preferably from 2 to 15 µm, more preferably from 2.4 to 11 µm, and the interlayer ratio is generally 30% or more, preferably from 30 to 90%. In expressions (1) and (3), $t_3$ is preferably from 0.6 to 9 µm, more preferably from 1 to 8 µm.

The interlayer may be a layer comprising only a resin or a layer additionally containing a filler such as an inorganic particle or carbon black. The interlayer containing a filler can show better abutting against the magnetic head.

In the present invention, the Young's modulus of the interlayer is controlled to generally from 10 to 150 Kg/mm², preferably from 50 to 150 Kg/mm², more preferably from 60 to 140 Kg/mm². The term "Young's modulus" as used herein means one in the longitudinal direction and the value thereof is determined by a tensile tester (stress strain gauge).

The Young's modulus of the interlayer can be controlled by selecting the components of the interlayer, for example, by appropriately selecting the kind, the composition and the blending amount of the resin and the filler.

The resin component for use in the interlayer may be any if it can be used at least in the abrasive layer. In particular, when the abrasive layer and the interlayer are formed by a wet-on-wet coating method, uniform layers can be formed by using the same binder resin in two layers. The resin component of the interlayer is preferably polyurethane or polyurethane polyester because elasticity can be easily imparted to the interlayer.

In the case when the interlayer contains a filler, the filler content thereof is preferably rendered smaller than the abrasive particle content of the abrasive layer.

By using as the filler an abrasive particle which can be used in the abrasive layer, the polishing rate can be expedited. If carbon black is added as the filler, the antistatic effect can be provided.

Further, when the interlayer contains a filler, a binder resin having a polar group, in particular, —$SO_3Na$ or —$OSO_3H$, is preferably used because the filler can show excellent dispersibility.

The proportion of the binder resin having a polar group/the binder resin having a polar group+the other binder resin is 20 to 100 wt %.

The surface potential of the interlayer is controlled to generally $1 \times 10^{10}$ Ω/sq or less, preferably $1 \times 10^8$ Ω/sq or less.

The filler is added to the interlayer in an amount of from 10 to 400 parts by weight, preferably from 20 to 350 parts by weight, per 100 parts by weight of resin. And, the carbon black is used in an amount of generally from 0 to 100 wt %, preferably from 20 to 80 wt % of the filler.

The Young's modulus in the width direction (i.e, the transverse direction) of the abrasive tape of the present invention is generally from 200 to 800 Kg/mm², preferably from 300 to 500 Kg/mm², more preferably from 350 to 450 Kg/mm² and the Young's modulus in the longitudinal direction (i.e, the longer direction) is generally from 200 to 800 Kg/mm², preferably from 250 to 750 Kg/mm², more preferably from 300 to 700 Kg/mm². These Young's moduli can be controlled by setting the above-described thicknesses $t_1$, $t_2$ and $t_3$ and at the same time, selecting the constituent materials of respective layers, namely, the constituent materials of the flexible support, the interlayer and the abrasive layer. Examples of the constituent materials for respective layers include a resin, an inorganic powder, carbon black and an abrasive, and the kind and the amount of these materials are selected according to the layer.

The abrasive tape of the present invention can polish the magnetic head into a desired shape.

The preferred embodiment of the present invention is described below.

1) The abrasive particle is α-alumina, diamond, SiC or chromium oxide and the particle size is generally from 0.1 to 10 µm, preferably from 0.1 to 3.0 µm.

2) The flexible support is polyethylene terephthalate (PET), polyethylene naphthalate (PEN) or aramid.

Hitherto, for example, when a #4,000 abrasive particle is used, the grinding force is inferior to that of an abrasive particle of #2,000 or less, however, if the present invention is applied, even when a #4,000 abrasive particle is used, the grinding force can be greater than that achieved when an abrasive particle of #2,000 or less is used.

In order to reduce the coefficient of friction in the running system of an abrasive tape comprising a flexible support having thereon an abrasive layer comprising an abrasive and a binder resin, a back-coating layer comprising carbon black and a binder resin may be provided on the back surface of the flexible support with the abrasive layer.

Examples of the abrasive for use in the abrasive layer of an abrasive tape of the present invention include chromium oxide, α-alumina, silicon carbide, non-magnetic iron oxide, magnetic iron oxide, iron oxide red (α-iron oxide), diamond, γ-alumina, α,γ-alumina, fused alumina, cerium oxide, corundum, artificial diamond, garnets, emery (main component: corundum and magnetite), garnet, silica rock, silicon nitride, boron nitride, molybdenum carbide, boron carbide, tungsten carbide and titanium carbide, and those having Mohs' hardness of 6 or more are used solely or in combination of two, three or four thereof. The abrasives used in combination preferably have a pH of from 2 to 10, more preferably from 5 to 10. The abrasive is used as a main constituent material of the abrasive layer. In the present invention, a magnetic powder may also be used in an amount of 40 wt % or less of the above-described non-magnetic abrasive.

In order to prevent the static destruction due to the static electricity generated between the materials to be polished, carbon black can be preferably incorporated into the abrasive layer.

Examples of carbon black to be incorporated in the abrasive layer of the present invention include furnace black for rubber, thermal black for rubber, black for color, and acetylene black. The carbon black is used as antistatic agents, light screens, friction coefficient adjustors or durability improvers. Specific examples of abbreviations of the carbon black in the U.S. include SAF, ISAF, IISAF, T, HAF, SPF, FF, FEF, HMP, GPF, APF, SRF, MPF, ECF, SCF, CF, FT, MT, HCC, HCF, MCF, LFF, and RCF. Thus, carbon blacks classified according to D-1765-82a of ASTM in the U.S. can be used. These carbon blacks can be also used in the interlayer. The carbon black to be used in the present invention exhibit an average grain size of 5 to 1,000 mµ (as determined by electron microscope), a specific surface area of 1 to 800 $m^2/g$ as determined by the nitrogen adsorption process, a pH value of 4 to 11 (as determined by JIS-K-6221-1982) and a dibutyl phthalate (DBP) oil absorption of 10 to 800 ml/100 g (as determined by JIS-K-6221-1982). The size of carbon black to be used in the present invention may range from 5 mµ to 100 mµ for the purpose of lowering the surface electric resistance of the coating film or may range from 50 mµ to 1,000 mµ for the purpose of controlling the strength of the coating film.

Thus, the kind and content of carbon black are properly used depending on the purpose required for the abrasive tape. These carbon blacks may be subjected to surface treatment with a dispersant as mentioned later or graft polymerization with a resin. Carbon black whose surface has been partially graphitized by treating the material at a furnace temperature of 2,000° C. or higher may be used. As special carbon black there may be used hollow carbon black. When incorporated in the abrasive layer, the carbon black is preferably used in an amount of 0.1 to 100 parts by weight based on 100 parts by weight of inorganic powders. When incorporated in the backing layer, the carbon black is preferably used in an amount of 20 to 400 parts by weight based on 100 parts by weight of binder. For carbon blacks which can be incorporated in the backing layer, reference ca be made to *Carbon Black Binran (Handbook of Carbon Black)*, (Carbon Black Kyokai, 1971).

As the binder resin to be incorporated in the abrasive layer of the present invention there can be used any known thermoplastic resin, thermosetting resin, reactive resin, electron radiation curing resin, ultraviolet curing resin, visible radiation curing resin, mildewproofing resin or mixture thereof. As such a thermoplastic resin there can be used one having a softening temperature of 150° C. or lower, an average molecular weight of 10,000 to 300,000, and a polymerization degree of about 10 to 2,000, preferably 200 to 700. Examples of such a thermoplastic resin include vinyl chloride-vinyl acetate copolymers, vinyl chloride copolymers, vinyl chloride-vinyl acetate-vinyl alcohol copolymers, vinyl chloride-vinyl alcohol copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, nylon-silicone resins, nitrocellulose polyamide resins, polyvinyl fluorides, vinylidene chloride-acrylonitrile copolymers, butadiene-acrylonitrile copolymers, polyamide resins, polyvinyl butyrals, cellulose derivatives (e.g., cellulose acetate butyrate, cellulose diacetate, cellulose triacetate, cellulose propionate, nitrocellulose, ethylcellulose, methylcellulose, propylcellulose, methyl ethyl cellulose, carboxymethyl cellulose, acetyl cellulose), styrene-butadiene copolymers, polyester resins, polycarbonate resins, chlorovinyl ether-acrylic acid ester copolymers, amino resins, various synthetic rubber thermoplastic resins, and mixtures thereof.

The thermosetting resin or reactive resin exhibits a molecular weight of 200,000 or less in the form of coating solution but approaches infinity when it is subjected to heating and moistening after coating and drying to undergo reaction such as condensation and addition. Preferred among these resins are those which do not soften or melt until they undergo thermal decomposition. Specific examples of such resins include phenolic resins, phenoxy resins, epoxy resins, polyurethane resins, polyester resins, polyurethane polycarbonate resins, urea resins, melamine resins, alkyd resins, silicone resins, acrylic reactive resins (electron radiation curing resin), epoxy-polyamide resins, nitrocellulose melamine resins, mixtures of high molecular polyester resins and isocyanate prepolymers, mixtures of methacrylic acid salt copolymer and diisocyanate prepolymer, mixtures of polyester polyols and polyisocyanates, ureaformaldehyde resins, mixtures of low molecular glycols, high molecular diols and triphenylmethane triisocyanates, polyamine resins, polyimine resins, and mixtures thereof. These thermoplastic, thermosetting and reactive resins normally contain as functional groups other than the main functional group for the resin, one to six functional groups selected from the group consisting of acidic groups such as a carboxylic acid (—COOM in which M represents a hydrogen atom, an alkaline metal, an alkaline earth metal or a hydrocarbon group), sulfinic acid, sulfenic acid, sulfonic acid (—$SO_3M$), phosphoric acid (—PO(OM)(OM)), phosphonic acid, sulfuric acid (—$OSO_3M$) and ester group thereof; amphoteric groups such as amino acids, aminosulfonic acids, sulfuric or phosphoric esters of amino alcohol, sulfobetaine, phosphobetaine, and alkylbetaine; an amino group; an imino group; an imide group; an amide group; a hydroxyl group; an alkoxyl group; a thiol group; an alkylthio group; a halogen atom (F, Cl, Br, I); a silyl group; a siloxane group; an epoxy group; an isocyanate group; a cyano group; an nitrile group; an oxo group; an acryl group; and a phosphine group.

It is preferred for accelerating dispersion of the abrasive particle and improving the strength of the coating film of abrasive layer that these functional groups each is incorporated in an amount of $1 \times 10^{-6}$ equivalent to $1 \times 10^{-2}$ equivalent per g of resin.

These binder resins can be used singly or in combination and further be added with the other additives. In the mixing ratio of the abrasive of the abrasive layer and the binder resin, the binder resin is used in an amount of generally 5 to 100 parts by weight, preferably 5 to 70 parts by weight and more preferably 8 to 50 parts by weight, per 100 parts by weight of the abrasive. If desired, the backing layer may be provided on the opposite surface of the abrasive layer. When the backing layer is provided, the backing layer can contain the same binder resin as in the abrasive layer. In the mixing ratio of fine powder and binder resin contained in the backing layer, the binder resin is used in an amount of 8 to 100 parts by weight per 100 parts by weight of the fine powder.

The examples of the additives include a dispersant, a lubricant, an antistatic agent, an oxidation inhibitor, a mildewproofing agent, a coloring agent and a solvent.

A polyisocyanate used in the present invention is not particularly limited. That is, the well-known hardening agent used for the binder resin conventionally can be used.

As a polyisocyanate used in the present invention there can be used an isocyanate such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate and isophorone diisocyanate; a product of the reaction of such an isocyanate and a polyalcohol; a dimeric to decameric polyisocyanate produced by the condensation of isocyanates; or an isocyanate-terminated product of the reaction of a polyisocyanate and a polyurethane. Such a polyisocyanate preferably has an average molecular weight of 100 to 20,000. Examples of commercial name of these polyisocyanates include Coronate L, Coronate HL, Coronate 2030, Coronate 2031, Millionate MR, Millionate MTL (Nippon Polyurethane Co, Ltd.), Takenate D-102, Takenate D-110N, Takenate D-200, Takenate D-202, Takenate 300S, Takenate 500 (Takeda Chemical Industries, Ltd.), Sumidur T-80, Sumidur 44S, Sumidur PF, Sumidur L, Sumidur N, Desmodur L, Desmodur IL, Desmodur N, Desmodur HL, Desmodur T65, Desmodur 15, Desmodur R, Desmodur RF, Desmodur SL, and Desmodur Z4273 (Sumitomo Byer Co, Ltd.). These polyisocyanates may be singly used. Alternatively, two or more of these polyisocyanates may be used in combination utilizing their difference in curing reactivity. Further, for the purpose of accelerating the curing reaction, a hydroxyl group (e.g. butanediol, hexanediol, polyurethane having a molecular weight of 1,000 to 10,000, water), a compound containing an amino group (e.g. monomethylamine, dimethylamine, trimethylamine), or a catalyst such as metallic oxide catalyst and iron acetylacetonate may be used as well. These hydroxyl groups or amino-containing compounds are preferably polyfunctional. Such a polyisocyanate may be preferably incorporated both in the abrasive layer and backing layer in an amount of 2 to 70 parts by weight, more preferably 5 to 50 parts by weight, based on 100 parts by weight of the total amount of binder resin and polyisocyanate.

Further, the polyisocyanate may be preferably incorporated in the interlayer in an amount of 10 to 50 parts by weight, more preferably 20 to 40 parts by weight based on 100 parts by weight of the total amount of binder resin and polyisocyanate.

In a method of the present invention, the undercoating layer may be provided between the support of the abrasive tape and the abrasive layer for preventing peeling of the abrasive layer, preventing falling away of the abrasive particle from the abrasive layer, and preventing damage of edge surface of the abrasive tape.

The undercoating layer preferably contains a thermosetting resin, more preferably a polyester resin or a polyurethane resin having a glass transition temperature (Tg) of −40° to 50° C. among the thermosetting resins. Particularly preferably, the undercoating layer contains a polyester resin having a polar functional group for improving adhesion (strength) of the abrasive layer and holding the improved adhesion thereof after storage.

To the abrasive layer of the present invention, powdered lubricants described below may be added for reducing a friction coefficient and preventing adhesion of interlaminar.

The lubricant is added to the abrasive layer in an amount of preferably 1 to 50 wt %, more preferably 2 to 25 wt %, and most preferably 3 to 10 wt % based on the abrasive particle.

Examples of powdered lubricants to be incorporated in the abrasive layer of the present invention include inorganic fine powders such as graphite, molybdenum disulfite, boron nitride, graphite fluoride, calcium carbonate, barium sulfate, silicon oxide, titanium oxide, zinc oxide, tin oxide and tungsten disulfite; and resin fine powders such as acrylstyrene resin fine powder, benzoguanamine resin fine powder, melamine resin fine powder, polyolefin resin fine powder, polyester resin fine powder, polyamide resin fine powder, polyimide resin fine powder and polyethylene fluoride resin fine powder.

Further, the abrasive layer may contain an organic lubricant for reducing a friction coefficient and controlling an elasticity of the coating film.

The organic lubricant is contained in the abrasive layer in an amount of preferably 0.01 to 10 wt % and more preferably 0.05 to 5 wt % based on the abrasive particles.

As organic lubricants there may be used fluorine- or silicon-containing compounds such as silicone oil (e.g., dialkyl polysiloxane, dialkoxy polysiloxane, phenyl polysiloxane, fluoroalkyl polysiloxane ("KF96", "KF69" manufactured by Shin-Etsu Chemical Co, Ltd.)), aliphatic acid modified silicone oil, fluorine alcohol, polyolefin (e.g., polyethylene wax, polypropylene), polyglycol (e.g. ethylene glycol, polyethylene oxide wax), tetrafluoroethylene oxide wax, polytetrafluoroglycol, perfluoroalkyl ether perfluoroaliphatic acid, perfluoroaliphatic ester, perfluoroalkylsulfuric acid ester, perfluoroalkylsulfonic acid ester, perfluoroalkylbenzenesulfonic acid ester and perfluoroalkylphosphoric acid ester; organic acids and organic ester compounds such as alkylsulfuric acid ester, alkylsulfonic acid ester, alkylphosphonic acid triester, alkylphosphonic acid monoester, alkylphosphonic acid diester, alkylphosphoric acid ester and succinic acid ester; nitrogen- or sulfur-containing heterocyclic compounds such as triazaindolizine, tetrazaindene, benzotriazole, benzotriazine, benzodiazole and EDTA; aliphatic acid esters made of monobasic aliphatic acid having from 10 to 40 carbon atoms and any one or more of monovalent, divalent, trivalent, tetravalent, and hexavalent alcohols having from 2 to 40 carbon atoms, aliphatic esters made of monobasic aliphatic acid having 10 or more carbon atoms and monovalent to hexavalent alcohol having carbon atoms, totalling 11 to 70 carbon atoms with that of the aliphatic acid; aliphatic acids, aliphatic amides, aliphatic alkylamides, and aliphatic alcohols, having from 8 to 40 carbon atoms. Preferred examples of such organic lubricants include butyl caprilate, octyl caprilate, ethyl laurate, butyl laurate, octyl laurate, ethyl myristate, butyl myristate, octyl myristate, 2-ethylhexyl myristate, ethyl palmirate, butyl palmitate, octyl palmitate, 2-ethylhexyl palmirate, ethyl stearate, butyl stearate, isobutyl stearate, octyl stearate, 2-ethylhexyl stearate, amyl stearate, isoamyl stearate, 2-ethylpentyl stearate, 2-hexyldecyl stearate, isotridecyl stearate, amide stearate, alkylamide stearate, butoxyethyl stearate, stearate, anhydrosorbitan monostearate, anhydrosorbitan distearate, anhydrosorbitan tristearate, anhydrosorbitan tetrastearate, oleyl oleate, oleyl alcohol, lauryl alcohol, montan wax, and carnauba wax. These organic lubricants may be used singly or in combination. In the present invention, these lubricants may be used with so-called lubricant additives, singly or in combination. Examples of such lubricant additives include oxidation inhibitors known as rust preventives (e.g. alkyl phenol, benzotriazine, tetrazaindene, sulfamide, guanidine, nucleic acid, pyridine, amine, hydroquinone, metal chelating agent such as EDTA), rust preventives (e.g. naphthenic acid, alkenylsuccinic acid, phosphoric acid, dilauryl phosphate), oil agents (e.g, colza oil, lauryl alcohol), extreme-pressure agents (e.g, dibenzyl sulfide, tricresyl phosphate, tributyl phosphite), detergent-dispersants, viscosity index improvers, pour point depressants, and anti-foaming agents. Such the lubricant may be used in an amount of 0.01 to 30 parts by weight based on 100 parts by weight of binder in the abrasive layer. For the details of such the lubricant, reference can be made to *IBM Technical Disclosure Bulletin*, vol. 9, No. 7, page 779 (December, 1966), *ELECTRONIK*, No. 12, page 380 (1961), and *Kagaku Binran (Handbook of Chemistry)*, Application Edition, pp. 954–967, (Maruzen, 1980).

Examples of dispersants or dispersion aids which may be used for aiding dispersion of the abrasive particle in the abrasive layer of the present invention include aliphatic acids having from 2 to 40 carbon atoms ($R_1COOH$ in which $R_1$ is an alkyl, phenyl or aralkyl group having from 1 to 39 carbon atoms) such as caprilic acid, capric acid, lauric acid, myristic acid, palmitic acid, stearic acid, oleic acid, elaidic acid, linoleic acid, stearolic acid, behenic acid, maleic acid and phthalic acid; salts of these aliphatic acids with alkaline metals (e.g, Li, Na, K, $NH_4^+$) or alkaline earth metals (e.g, Mg, Ca, Ba); metallic soap made of Cu, Pb, etc. (copper oleate); aliphatic amides; and lecithin (soybean oil lecithin), etc. Besides these compounds, higher alcohols having from 4 to 40 carbon atoms (e.g, butanol, octyl alcohol, myristyl alcohol, stearyl alcohol), sulfuric acid esters thereof; sulfonic acids; phenylsulfonic acids; alkylsulfonic acids; sulfonic esters; phosphoric acid monoesters; phosphoric acid diesters; phosphoric acid triesters; alkylphosphonic acids; phenylphosphonic acids; and amine compounds can be used. Further, polyethylene glycols, polyethylene oxides, sulfosuccinic acids, sulfosuccinic acid metal salts, and sulfosuccinic acid esters can be used. One or more kinds of these dispersants are normally used. These dispersants may be each used in an amount of 0.005 to 20 parts by weight based on 100 parts by weight of binder. These dispersants may be previously coated on the surface of ferromagnetic fine powder or non-magnetic fine powder or may be added to the system during dispersion.

Examples of mildewproofing agents which may be used in the abrasive layer of the present invention include 2-(4-thiazolyl)benzimidazole, N-(fluorodichloromethylthio)phthalimide, 10,10'-oxybisphenoxarcine, 2,4,5,6-tetrachloroisophthalonitrile, P-tolyldiiodemethylsulfone, triisodeallyl alcohol, dihydroaceto acid, mercury phenyloleate, bis(tributyltin) oxide, and salicylanilide. These examples are disclosed in *Biseibutsu Saigai to Boshi Gijutsu (Microbic Disaster and Preventive Technique)*, (Kogaku Tosho, 1972), and *Kagaku to Kogyo (Chemistry and Industry)*, 32, 904 (1979).

Examples of antistatic agents other than carbon black which may be used in the present invention include electrically conductive powders such as graphite, modified graphite, carbon black graft polymer, tin oxide-antimony oxide, tin oxide and titanium oxide-tin oxide-antimony oxide; natural surface active agents such as saponin; nonionic surface active agents such as ones of the alkylene oxide type, glycerin type, or glycidol type, polyhydric alcohols, esters of polyhydric alcohols, and adducts of alkylphenolethylene oxide; cationic surface active agents such as higher alkylamine, cyclic amine, hydantoin derivative, amideamine, esteramide, quaternary ammonium salt, pyridine, other heterocycles, phosphonium and sulfonium; anionic surface active agents containing acidic groups such as carboxylic acid, sulfonic acid, phosphonic acid, phosphoric acid, sulfuric acid ester, phosphonic acid ester and phosphoric acid ester; and amphoteric surface active agents such as amino acids, aminosulfonic acids, sulfuric or phosphoric acid esters of aminoalcohol and alkylbetaine-type surfactants. Some examples of surface active agent compounds which can be used as antistatic agents are disclosed in *Kaimen Kasseizai no Gosei to sono oyo (Synthesis and application of surface active agent)*, (Maki Shoten, 1972), A. W. Baily, *Surface Active Agents* (Interscience Publication Corporated, 1985), T. P. Sisley, *Encyclopedia of Surface Active Agents*, vol. 2 (Chemical Publish Company, 1964), *Kaimen Kasseizai Binran (Handbook of Surface Active Agents)*, 6th ed. (Sangyo Tosho K. K, 1966), and Hideo Marushige, *Taidenboshizai (Antistatic Agents)* (Saiwai Shobo, 1968). These surface active agents may be incorporated in the system singly or in combination. Such a surface active agent may be used in an amount of 0.01 to 10 parts by weight based on 100 parts by weight of the abrasive particle in the abrasive layer. Such the surface active agent in the backing layer may also be used in an amount of 0.01 to 30 parts by weight based on 100 parts by weight of binder in the backing layer. Such the surface active agent is used as an antistatic agent but may occasionally be used for other purpose such as accelerating dispersion and curing, improving magnetic characteristics and lubricating property and facilitating coating and wetting.

Examples of organic solvents which may be used in the dispersion, kneading and coating according to the present invention include any proportion ketones such as acetone, methyl ethyl ketone, methyl isobutyl ketone, cyclohexanone, isophorone and tetrahydrofuran; alcohols such as methanol, ethanol, propanol, butanol, isobutyl alcohol, isopropyl alcohol and methyl cyclohexanol; esters such as methyl acetate, ethyl acetate, butyl acetate, isobutyl acetate, isopropyl acetate, ethyl lactate, and glycol acetate monoethyl ether; ethers such as diethyl ether, tetrahydrofuran, glycol dimethyl ether, glycol monoethyl ether and dioxane; tar (aromatic hydrocarbons) such as benzene, toluene, xylene, cresol, chlorobenzene and styrene; chlorinated hydrocarbons such as methylene chloride, ethylene chloride, carbon tetrachloride, chloroform, ethylene chlorohydrin and dichlorobenzene; N,N-dimethylformaldehyde; and hexane. In general, two or more kinds of these solvents may be used in any proportion. These solvents may contain impurities (e.g, polymers of these solvents, water content, starting materials) in an amount as slight as 1% by weight or less. These solvents may each be used in an amount of 100 to 20,000 parts by weight based on 100 parts by weight of the total solid content in the coating solution for the abrasive layer or the coating solution for the undercoating layer. The preferred solid content of the coating solution is from 1 to 40% by weight. The preferred solid content of the coating solution for the backing layer is from 1 to 20% by weight. An aqueous solvent (e.g, water, alcohol, acetone) may be used instead of the organic solvent.

In the formation of the abrasive layer, the above compounds are dissolved in the organic solvent in an optimum composition and combination to prepare the coating solution. The thus-obtained coating solution is coated on the support and then dried, and further if desired, orientated.

It is preferred that in the flexible support for the abrasive tape, the Young's modulus of either of in the longitudinal direction and in the width direction is 400 $Kg/mm^2$ or more.

Examples of material of the flexible support for the abrasive tape include polyesters such as polyethylene terephthalate (PET) and polyethylene naphthalate; polyolefins such as polypropylene; cellulose derivatives such as cellulose acetate and cellulose diacetate; plastics such as vinyl resins such as polyvinyl chloride, polycarbonate, polyimide, polyamide, polysulfone, polyphenylsulfone and polybenzoxazole; metal such as aluminum and copper and ceramics such as glass. Among these, polyethylene naphthalate or polyamide is preferred as the material of the support.

The flexible support for the abrasive tape may be previously subjected to corona discharge treatment, plasma treatment, undercoating treatment, heat treatment, dust removing treatment, metal vapor deposition treatment and/ or alkali treatment. For the details of such the support, reference can be made to West German Patent 3338854A, JP-A-59-116926, JP-A-61-129731, U.S. Pat. No. 4,388,368, and Yukio Mitsuishi, *Seni to Kogyo IFiber and Industry*), vol. 31, pp. 50–55, 1975. When the support is used for the abrasive tape, it is preferred that the support preferably exhibits an average surface roughness of 0.001 to 1.5 μm (cut off value: 0.25 mm) at the central line.

The dispersion and kneading methods are not specifically limited. The order of addition of the various components (e.g., resin, powder, lubricant, solvent), the position at which these components are added during dispersion or kneading, the dispersion temperature (0° to 80° C.), etc. can be properly determined. The preparation of the coating solution for the abrasive layer can be accomplished by means of a commonly used kneader such as two-roll mill, three-roll mill, ball mill, pebble mill, tron mill, sand grinder, Szegvari, attritor, high speed impeller, dispersing machine, high speed stone mill, high speed impact mill, disper, kneader, high speed mixer, ribbon blender, cokneader, intensive mixer, tumbler, blender, disperser, homogenizer, single screw extruder, double screw extruder and ultrasonic wave dispersing machine. In general, the dispersion and kneading can be continuously carried out by means of a plurality of these dispersing machine and kneaders. The dispersion and kneading techniques are further described in T. C. Patton, *Paint Flow and Pigment Dispersion* (John Wiley & Sons, 1964), Shinichi Tanaka, *Kogyo Zairyo (Industrial Materials)*, vol. 25, No. 37 (1977), and references cited therein. As auxiliary materials for maximizing the efficiency of dispersion and kneading there can be used steel balls, steel beads, ceramic beads, glass beads and organic polymer beads having a diameter of 0.05 mm to 10 cm as calculated in terms of sphere. These materials are not limited to spheres. These materials are also described in U.S. Pat. Nos. 2,581,414 and 2,855,156. In the present invention, the dispersion and kneading can be carried out by methods as described in the above mentioned references and references cited therein to prepare the coating solutions for the abrasive layer and backing layer, respectively.

The coating of the above mentioned coating solution for the abrasive layer can be accomplished by adjusting the viscosity of the coating solution to 1 to 20,000 cSt. (at 25° C.), and then coating the coating solution on the flexible support by means of an air doctor coater, blade coater, air knife coater, squeeze coater, impregnation coater, reverse roll coater, transfer roll coater, gravure coater, kiss coater, cast coater, spray coater, rod coater, forward roll coater, curtain coater, extrusion coater, bar coater, lip coater or the like. Other methods can be also used. These methods are further described in *Coating Engineering, (Asakura Shoten, pp. 253–277, Mar. 20, 1971)*. The order of coating of these coating solutions can be arbitrarily selected. The coating of undercoating layers and/or the corona discharge treatment can be continuously carried out before the coating of desired solutions for improving the adhesion between the abrasive layer and the support. If the abrasive layer is to consist of a plurality of layers, these layers may be simultaneously or successively multi-coated. These methods are further described in JP-A-57-123532, JP-A-59-142741, JP-A-59-165239, and JP-B-62-37451.

The coating solution for the abrasive layer having a thickness of about 1 to 100 μm which has thus been provided on the support is optionally dried immediately at a temperature of 20° to 130° C. in many stages. The resulting abrasive layer is then dried to a thickness of 0.1 to 10 μm. During this process, the support is normally carried at a rate of 10 m/min. to 900 m/min. through a plurality of drying zones whose temperature is controlled to 20° to 130° C. so that the remaining amount of solvent in the coating film reaches 0.1 to 40 mg/m$^2$. If desired, the backing layer may be provided in the same manner as in the above abrasive layer. Subsequently, the abrasive layer and backing layer thus obtained may be optionally subjected to surface smoothening so that they exhibit a center-line average surface roughness of 0.001 to 0.3 μm (cutoff value: 0.25 mm (according to JIS B0601)). The material is then cut into desired shapes to prepare the abrasive tape of the present invention. These preparation methods may selectively comprise powder pretreatment and surface treatment, kneading and dispersion, coating, orientation, and drying, smoothening treatment, heat treatment, BE treatment, surface cleaning treatment, cutting, winding, etc. These steps are preferably carried out in succession.

The abrasive tape which has thus been cut is then wound on the desired plastic or metal reel. Immediately before winding or during the previous step, the abrasive tape may be preferably subjected to varnish and/or cleaning on the abrasive layer, backing layer, edge surface, base surface or the like. Varnish specifically serves to trim off protrusions on the surface of the abrasive tape by means of a hard material such as sapphire blade, shaving blade, ultrahard blade, diamond blade ahd ceramic blade so that the abrasive tape having a uniformity or smoothness is obtained. The Mohs' hardness of these blade materials is preferably 8 or more but is not specifically limited and may be enough to remove the protrusions from the surface of the abrasive tape. These materials are not necessarily in the form of blade but may be in the square, circular or wheel form (these materials may optionally be coated on the periphery of a rotary cylinder). The cleaning of the abrasive is carried out by wiping the surface layer of the abrasive tape on the abrasive layer, backing layer, edge surface, or back side base surface with a nonwoven fabric for the purpose of removing stain or extra lubricant therefrom. Examples of such the wiping material include various Vilenes (produced by Japan Vilene Co. Ltd.); Toraysee and Ecsaine (Produced by Toray Industries, Inc.); Kimwipe produced by Tojo Kimberly Co. Ltd.; various polishing tapes (lapping tapes) produced by Fuji Photo Film Co. Ltd.; nylon nonwoven fabric; polyester nonwoven fabric; rayon nonwoven fabric; acrylonitrile nonwoven fabric; mixed nonwoven fabric; and tissue paper.

For the abrasive particle and/or non-magnetic powder, binder, additives (e.g. lubricant, dispersant, anti-static agent, surface treatment agent, carbon black, light screen agent, oxidation inhibitor, mildewproofing agent), solvent and support (which may comprise an undercoating layer, backing layer or back undercoating layer) or the process for the preparation of abrasive tape, reference can be made also to JP-B-56-26890 (regarding a method for preparing a magnetic recording medium).

The present invention is described below in greater detail with reference to the examples. It will be apparent to one skilled in the art that various changes and modifications can be made on the components, ratios and operation orders in the examples without departing from the spirit and scope of the present invention. Accordingly, the present invention is by no means limited to these examples. In the examples, the part is by weight.

EXAMPLE 1

An abrasive tape sample was prepared by coating a coating solution having the following interlayer composition on a 100 μm-thick polyethylene terephthalate (PET) support to provide an interlayer consisting of polyester polyurethane resin having a thickness of 30 μm and then thereon an abrasive coating solution having the following composition was coated by bar coating to have a dry thickness of 5 μm, followed by drying and slitting. The obtained interlayer had a Young's modulus of 60 Kg/mm$^2$.

| Coating Solution Composition | |
|---|---|
| Abrasive (α-alumina, average particle size: 2 μm, Mohs' hardness: 9) | 100 parts |
| Binder C (vinyl chloride vinyl acetate resin) | 5 parts |
| Binder B (polyurethane, $1 \times 10^{-5}$ equivalent/g-resin of epoxy group containing $2 \times 10^{-3}$ equivalent/g-resin of sodium sulfonate, Mw: 70,000) | 6 parts |
| Binder A (polyisocyanate, a TDI (3 mols) adduct of trimethylol propane (1 mol)) | 3 parts |
| Lubricant (oleic acid/oleyl oleate) | 0.1 part |
| Diluent (methyl ethyl ketone/cyclo-hexanone = 2/1) | 200 parts |
| Diluent (toluene/MIBK) | 150 parts |
| Additive (carbon black) | 2 parts |
| Interlayer Composition | |
| Binder (polyurethane, "UR8300", produced by Toyobo KK) | 10 parts |
| Diluent (methyl ethyl ketone/cyclo-hexanone = 2/1) | 200 parts |

EXAMPLES 2 AND 3 AND COMPARATIVE EXAMPLES 1 TO 4

Abrasive tapes were prepared in the same manner as in Example 1 except for variously changing the thickness of the interlayer.

COMPARATIVE EXAMPLE 5

An abrasive tape was prepared in the same manner as in Example 1 except for changing the average particle size of the abrasive to 6 μm.

EXAMPLES 4 TO 7 AND COMPARATIVE EXAMPLES 6 TO 8

Abrasive tapes were prepared in the same manner as in Example 1 except for changing the thickness $t_1$ of the flexible support and the thickness $t_2$ of the interlayer.

EXAMPLES 8 AND 9 AND COMPARATIVE EXAMPLES 9 AND 10

Abrasive tapes were prepared in the same manner as in Example 1 except for changing the parts of Binders C, B and A as follows.

A magnetic head was polished by each of the tapes prepared in Examples 1 to 9 and Comparative Examples 1 to 10 above and the results are shown in Table 1.

In the Table 1, the magnetic head abrasion loss determined by applying a load of 50 g to the magnetic head is shown by a relative value to the abrasion loss of Comparative Example 1 as 100%.

Also, the head sliding surface was observed and samples underwent a scratch flaw (wound) of 1 μm in the width and 100 μm or more in the length were rated bad and others were rated good.

| | Binder C | Binder B | Binder A |
|---|---|---|---|
| Comparative Example 9 | 8 parts | 4 parts | 2 parts |
| Example 8 | 6 parts | 6 parts | 2 parts |
| Example 9 | 0 part | 9 parts | 5 parts |
| Comparative Example 10 | 0 part | 6 parts | 0 part |

TABLE 1

| Sample No. | Support $t_1$ (μm) | Interlayer, $t_2$ (μm) | 100 $t_2/t_1$ (%) | Abrasive Layer $t_3$ (μm) | Young's Modulus of Interlayer (Kg/mm$^2$) | Abrasion Loss of Magnetic Head (%) | Head Flaw |
|---|---|---|---|---|---|---|---|
| Example 1 | 100 | 30 | 30 | 5 | 60 | 350 | good |
| Example 2 | 100 | 50 | 50 | 5 | 60 | 400 | good |
| Example 3 | 100 | 90 | 90 | 5 | 60 | 400 | good |
| Comparative Example 1 | 100 | 0 | 0 | 5 | none | 100 | good |
| Comparative Example 2 | 100 | 5 | 5 | 5 | 60 | 100 | good |
| Comparative Example 3 | 100 | 15 | 15 | 5 | 60 | 100 | good |
| Comparative Example 4 | 100 | 25 | 25 | 5 | 60 | 100 | good |
| Comparative Example 5 | 100 | 0 | 0 | 5 | none | 400 | bad |
| Example 4 | 50 | 15 | 30 | 5 | 60 | 250 | good |
| Comparative Example 6 | 50 | 10 | 20 | 5 | 60 | 60 | good |
| Example 5 | 25 | 8 | 30 | 5 | 60 | 250 | good |
| Comparative | 25 | 5 | 20 | 5 | 60 | 40 | good |

TABLE 1-continued

| Sample No. | Support $t_1$ (μm) | Interlayer, $t_2$ (μm) | 100 $t_2/t_1$ (%) | Abrasive Layer $t_3$ (μm) | Young's Modulus of Interlayer (Kg/mm$^2$) | Abrasion Loss of Magnetic Head (%) | Head Flaw |
| --- | --- | --- | --- | --- | --- | --- | --- |
| Example 7 | | | | | | | |
| Example 6 | 10 | 5 | 50 | 5 | 60 | 250 | good |
| Example 7 | 10 | 3 | 30 | 5 | 60 | 200 | good |
| Comparative Example 8 | 10 | 1 | 10 | 5 | 60 | 30 | good |
| Comparative Example 9 | 25 | 8 | 30 | 5 | 300 | 100 | good |
| Example 8 | 25 | 8 | 30 | 5 | 150 | 250 | good |
| Example 9 | 25 | 8 | 30 | 5 | 10 | 270 | good |
| Comparative Example 10 | 25 | 8 | 30 | 5 | 5 | 270 | bad |

It is clearly seen from the results in Table 1 that samples in the examples of the present invention can polish the magnetic head in a short time with a high polishing force without wounding the head.

According to the present invention, since the thicknesses of the interlayer as a cushioning layer, the abrasive layer provided on the interlayer and the flexible support and the Young's modulus of the interlayer are specified, a thin film head for high density recording or a narrow head such as an amorphous head, a laminate head, an MIG head and an MR head can be polished in a short time to achieve smoothness or a desired shape without forming any alteration layer or the attachments (i.e. deposits) on the magnetic head can be polished without reducing the effective depth so much while ensuring good abutting against the head.

While the invention has been described in detail and with reference to specific embodiments thereof, it will be apparent to one skilled in the art that various changes and modifications can be made therein without departing from the spirit and scope thereof.

What is claimed is:

1. An abrasive tape for a thin film head or a narrow head consisting of an amorphous head, a laminate head, an MIG head and an MR head for high density recording, comprising a flexible support having thereon an abrasive layer, the abrasive layer comprising abrasive particles and a binder resin, wherein said abrasive layer has a thickness of from 0.3 to 10.0 μm, and an interlayer is provided between said abrasive layer and said flexible support, the thickness of said interlayer being 1 μm or more, 30% or more of the thickness of said flexible support and larger than the thickness of said abrasive layer, said interlayer having a Young's modulus of from 10 to 150 Kg/mm$^2$.

2. The abrasive tape as claimed as in claim 1, wherein the flexible support has a thickness of 5 to 100 μm.

3. The abrasive tape as claimed as in claim 1, wherein the abrasive particles are selected from the group consisting of α-alumina, diamond, SiC and chromium oxide, and have a particle size of from 0.1 to 10 μm.

4. The abrasive tape as claimed as in claim 2, wherein the flexible support is a material selected from the group consisting of polyethylene terephthalate, polyethylene naphthalene and aramid.

5. The abrasive tape as claimed in claim 1, wherein the interlayer contains a binder resin selected from the group consisting of polyurethane and polyurethane polyester.

6. The abrasive tape as claimed in claim 1, wherein the binder resin for the interlayer has a polar group.

* * * * *